(12) United States Patent
Yamamoto

(10) Patent No.: US 10,333,432 B2
(45) Date of Patent: Jun. 25, 2019

(54) VIBRATION TYPE ACTUATOR AND ULTRASONIC MOTOR

(71) Applicant: CANON KABUSHIKI KAISHA, Tokyo (JP)

(72) Inventor: Harushige Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 15/146,243

(22) Filed: May 4, 2016

(65) Prior Publication Data
US 2016/0336875 A1    Nov. 17, 2016

(30) Foreign Application Priority Data
May 11, 2015    (JP) .................. 2015-096177

(51) Int. Cl.
*H02N 2/02* (2006.01)
*H02N 2/00* (2006.01)
*G02B 7/08* (2006.01)

(52) U.S. Cl.
CPC .............. *H02N 2/026* (2013.01); *G02B 7/08* (2013.01); *H02N 2/0055* (2013.01)

(58) Field of Classification Search
CPC ......... H02N 2/02; H02N 2/026; H02N 2/0055
USPC ...................................... 310/323.01–323.21
See application file for complete search history.

(56) References Cited

U.S. PATENT DOCUMENTS

| 5,191,688 | A | * | 3/1993 | Takizawa .............. H01L 41/083 29/25.35 |
| 6,218,767 | B1 | | 4/2001 | Akada et al. |
| 2010/0133955 | A1 | | 6/2010 | Sakamoto |
| 2010/0245517 | A1 | | 9/2010 | Miyazawa et al. |
| 2011/0255185 | A1 | | 10/2011 | Hashi et al. |
| 2013/0141564 | A1 | | 6/2013 | Miyazawa |

FOREIGN PATENT DOCUMENTS

| EP | 2889997 A1 | 7/2015 |
| GB | 2458146 A | 9/2009 |
| JP | 2011-200053 A | 10/2011 |

(Continued)

OTHER PUBLICATIONS

The above foreign documents were cited in a British Search Report dated Oct. 24, 2016, a copy of which is enclosed, that issued in the corresponding U.K. Patent Application No. GB1607898.2.

(Continued)

*Primary Examiner* — Derek J Rosenau
(74) *Attorney, Agent, or Firm* — Cowan, Liebowitz & Latman, P.C.

(57) ABSTRACT

A vibration type actuator including a vibrator configured to vibrate due to a driving voltage, a slider configured to come into friction contact with the vibrator, a pressing plate for pressing the vibrator on the slider, a base to which the vibrator is fixed, a holding member configured to hold the base, and a coupling unit is provided. The vibration type actuator couples the vibrator and the holding member without backlash in a relative movement direction of the vibrator and the slider due to vibrations of the vibrator and freely moves the base with respect to the holding member in a direction of pressure of the pressing plate.

10 Claims, 4 Drawing Sheets

(56) References Cited

FOREIGN PATENT DOCUMENTS

JP    2013-258824 A    12/2013

OTHER PUBLICATIONS

The above foreign document was cited in the Feb. 5, 2019 Japanese Office Action, enclosed with an English Translation, that issued in Japanese Patent Application No. 2015096177.
The above patent document was cited in a British Office Action issued on April 23, 2019, a copy of which is enclosed, that issued in the corresponding U.K. Patent Application No. GB1607898.2.

* cited by examiner

VIBRATION TYPE ACTUATOR AND ULTRASONIC MOTOR

BACKGROUND OF THE INVENTION

Field of the Invention

The present invention relates to a vibration type actuator and an ultrasonic motor.

Description of the Related Art

Japanese Patent Laid-Open No. 2011-200053 discloses a vibration type actuator which brings a vibrator configured to periodically vibrate due to application of a high frequency voltage into pressure contact with a sliding member to drive the sliding member.

Since the vibrator is held by a thin plate in the vibration type actuator disclosed in Japanese Patent Laid-Open No. 2011-200053, a variation is generated in a pressing force when the vibrator is brought into pressure contact with the sliding member. Thus, a stabilized pressing force cannot be generated. Also, the thin plate is deformed in a direction of pressure of the vibrator on a slider, thereby resulting in component failure. Therefore, meticulous care needs to be taken at the time of assembly, and assembling workability of the vibration type actuator is not good. In addition, when an external force is applied in a direction of a pressing force, the thin plate is deformed and a function of the vibration type actuator is not stabilized.

SUMMARY OF THE INVENTION

The present invention provides a vibration type actuator which generates a stabilized pressing force of a vibrator on a sliding member and has excellent assembling workability.

A vibration type actuator of an embodiment according to the present invention includes a vibrator configured to vibrate due to a driving voltage, a sliding member configured to come into friction contact with the vibrator, a pressing unit for pressing the vibrator on the sliding member, a base to which the vibrator is fixed, a holding member configured to hold the base, a coupling unit for coupling the vibrator and the holding member without backlash in a relative movement direction of the vibrator and the sliding member due to vibrations and freely moving the base with respect to the holding member in a direction of pressure of the pressing unit, and a temporary fixing part formed at the base and the holding member and configured to restrict a movement in the direction of pressure of the base and the holding member.

According to the present invention, the vibration type actuator which generates the stabilized pressing force of the vibrator to the sliding member and has excellent assembling workability can be provided.

Further features of the invention will become apparent from the following description of exemplary embodiments (with reference to the attached drawings).

DESCRIPTION OF THE EMBODIMENTS

Figure 1:
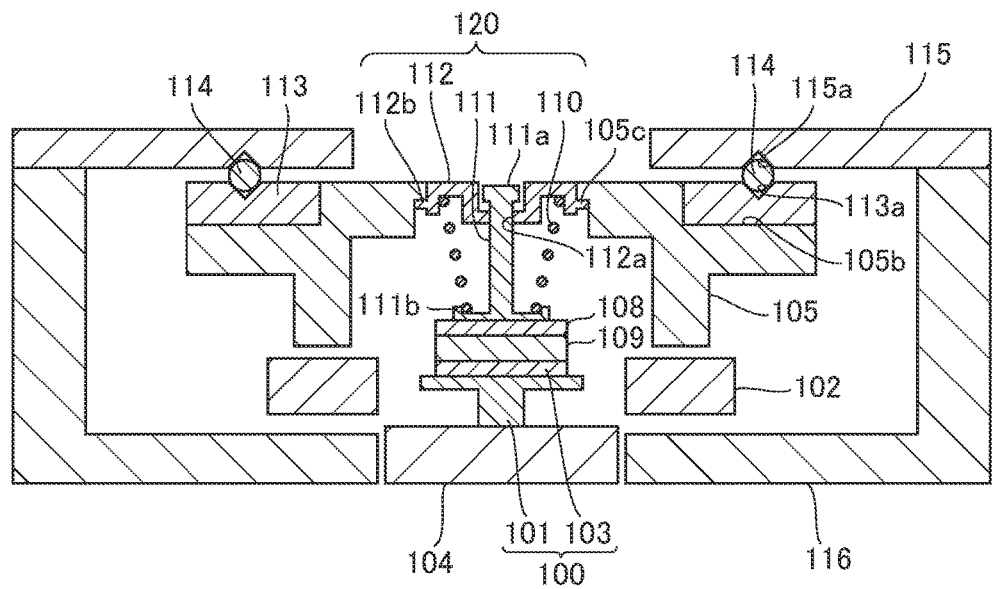
FIG. 1 is an example of a cross-sectional view of a major part of a vibration type actuator.
Figure 2:
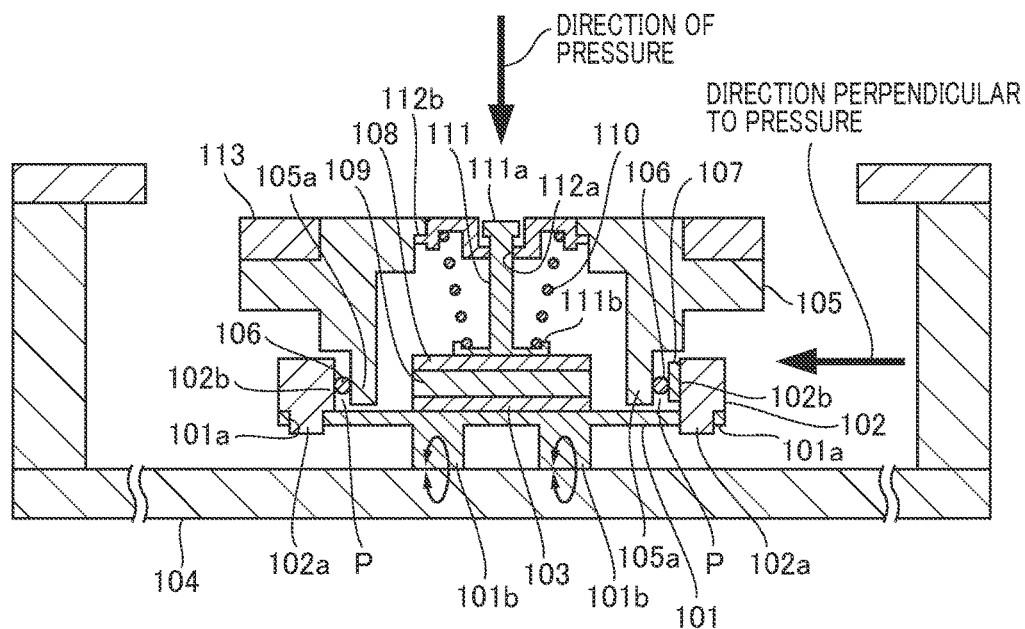
FIG. 2 is another example of the cross-sectional view of the major part of the vibration type actuator.

FIGS. 1 and 2 are examples of cross-sectional views of a major part of a vibration type actuator of an embodiment. FIG. 1 shows the cross-sectional view in a direction perpendicular to a driving direction of the vibration type actuator. FIG. 2 shows the cross-sectional view in the driving direction of the vibration type actuator. Hereinafter, although a case in which a linear motion type ultrasonic motor serves as the vibration type actuator will be described as an example, a rotary type or other types can also be applied.

A vibrator 100 includes a vibration plate 101 and a piezoelectric element 103 and is driven due to a driving voltage. A joined portion 101a of the vibration plate 101 is fixed to a joint convex portion 102a of a base 102 using adhesion and the like. (see FIG. 2). The base 102 is constituted by a quadrangular frame body and is constituted by a resin or a metal thicker than a thickness of the vibration plate 101. Also, the piezoelectric element 103 is firmly fixed to the vibration plate 101 using well-known adhesives and the like.

The piezoelectric element 103 is set such that the vibration plate 101 generates resonance in a longitudinal direction and a lateral direction when a high frequency voltage is applied. The vibrator 100 generates ultrasonic vibrations when a high frequency driving voltage is applied. As a result, as shown in FIG. 2, a tip of a pressure contact portion 101b formed on the vibration plate 101 moves elliptically. A frequency or a phase of a high frequency voltage applied to the piezoelectric element 103 is changed so that a rotational direction or an elliptical ratio can be appropriately changed to move as desired. Therefore, the vibrator 100 frictionally contacts with a slider 104 which is a sliding member so that a driving force causing relative movement between the vibrator 100 and the slider 104 is generated. In other words, the vibrator 100 itself can be driven using an optical axis (a direction perpendicular to the paper surface in FIG. 1 and a horizontal direction in FIG. 2) as a movement direction. The slider 104 is fixed to a unit support member 116 using well-known fastening means such as screws.

A holding member 105 holds the base 102. The vibrator 100 is fixed to the base 102. The holding member 105 is coupled to the vibrator 100 fixed to the base 102 using coupling unit to be described below.

Roller shafts 106 are rolling members. The two roller shafts 106 are disposed at both sides to sandwich the pressure contact portion 101b of the vibration plate 101. In other words, the two roller shafts 106 are disposed at a front side and a rear side in the movement direction of the vibrator 100. A leaf spring 107 is an elastic biasing member configured to elastically bias the roller shaft 106 in a relative movement direction of the vibrator 100 and the slider 104.

Two extending portions 105a extending downward in FIG. 2 are formed at the holding member 105. The roller shaft 106 and the leaf spring 107 are incorporated into incorporation space P which is a space between the extending portions 105a and coupling portions 102b of the base 102.

The leaf spring 107 is incorporated into the right incorporation space P in FIG. 2 along with one of the roller shafts 106. The leaf spring 107 elastically biases the roller shaft 106 so that the holding member 105 and the base 102 are biased in directions opposite to each other by means of one of the roller shafts 106 (right in FIG. 2). In the present embodiment, the holding member 105 is biased left in FIG. 2 and the base 102 is biased right in FIG. 2. The biased directions are directions (directions perpendicular to pressure) perpendicular to a direction of the pressure of the vibrator.

The roller shaft 106 incorporated into the other incorporation space P on the left in FIG. 2 is also sandwiched by the other extending portion 105a of the holding member 105 and the other coupling portion 102b of the base 102. Thus, a coupling unit for coupling the vibrator 100 and the holding member 105 can be realized without backlash in the relative movement direction of the vibrator 100 and the slider (the horizontal direction in FIG. 2). The coupling unit can serve to prevent most sliding resistance due to actions of the roller shafts in the direction of pressure of the vibrator 100 (the vertical direction in FIG. 2). Thus, the base 102 freely moves in the direction of pressure of a pressing plate with respect to the holding member 105. A biasing force of the leaf spring 107 is set to be larger than an inertial force due to acceleration and deceleration occurring when operations of the holding member 105 and driven parts start and stop. The driven parts are, for example, a second lens holding member 505 and a second lens 506 to be described below shown in FIG. 5. The base 102, the vibrator 100, and the holding member 105 can be controlled to be stably driven without generating relative displacement in the movement direction due to an inertial force at the time of driving through a setting of the biasing force of the leaf spring 107.

The pressing plate 108 presses the vibrator 100 into the slider 104. To be specific, the pressing plate 108 surrounds an elastic member 109 to press and hold the piezoelectric element 103. A pressing spring 110 is incorporated between a spring holding member 111 and a spring bottom plate 112 and is configured as a pressing spring unit. Since a large diameter tip 111a of the spring holding member 111 is lightly press-fitted to be incorporated into a fitting portion 112a of the spring bottom plate 112, the unit state can be maintained against a spring force of the pressing spring 110 after they are assembled.

A plurality of bayonet protrusions 112b are formed at an outer diameter portion of the spring bottom plate 112 in a circumferential direction. Positions of the bayonet protrusions 112b in the direction of pressure are defined due to a bayonet engaging portion 105c formed at the holding member in an incorporated state. At this time, a tip pressing portion 111b of the spring holding member 111 generates a pressing force pressing the vibrator 100 into the slider 104 by means of the pressing plate 108 and the elastic member 109 due to a biasing force of the pressing spring 110. Thus, the vibrator 100 and the slider 104 can frictionally contact with each other. A pressing unit 120 includes the pressing spring 110, the spring holding member 111, and the spring bottom plate 112.

A movement plate 113 is configured as a part of a guide portion fixed to a contact portion 105b of the holding member 105 using well-known methods such as adhesion or screwing. A plurality of V groove portions 113a into which balls 114 are fitted and configured to guide the holding member 105 in an optical direction are formed in the movement plate 113 (see FIG. 1). A cover plate 115 is fixed to the unit support member 116 using well-known screws and the like. The cover plate 115 is also configured as a part of the guide portion and surrounds the balls 114 using V groove portions 115a provided at positions facing the V groove portions 113a of the movement plate 113. Thus, the holding member 105 can be supported to be capable of advancing or retreating in the movement direction (the direction perpendicular to the paper surface in FIG. 1 and the horizontal direction of the paper surface in FIG. 2).

Figure 3:
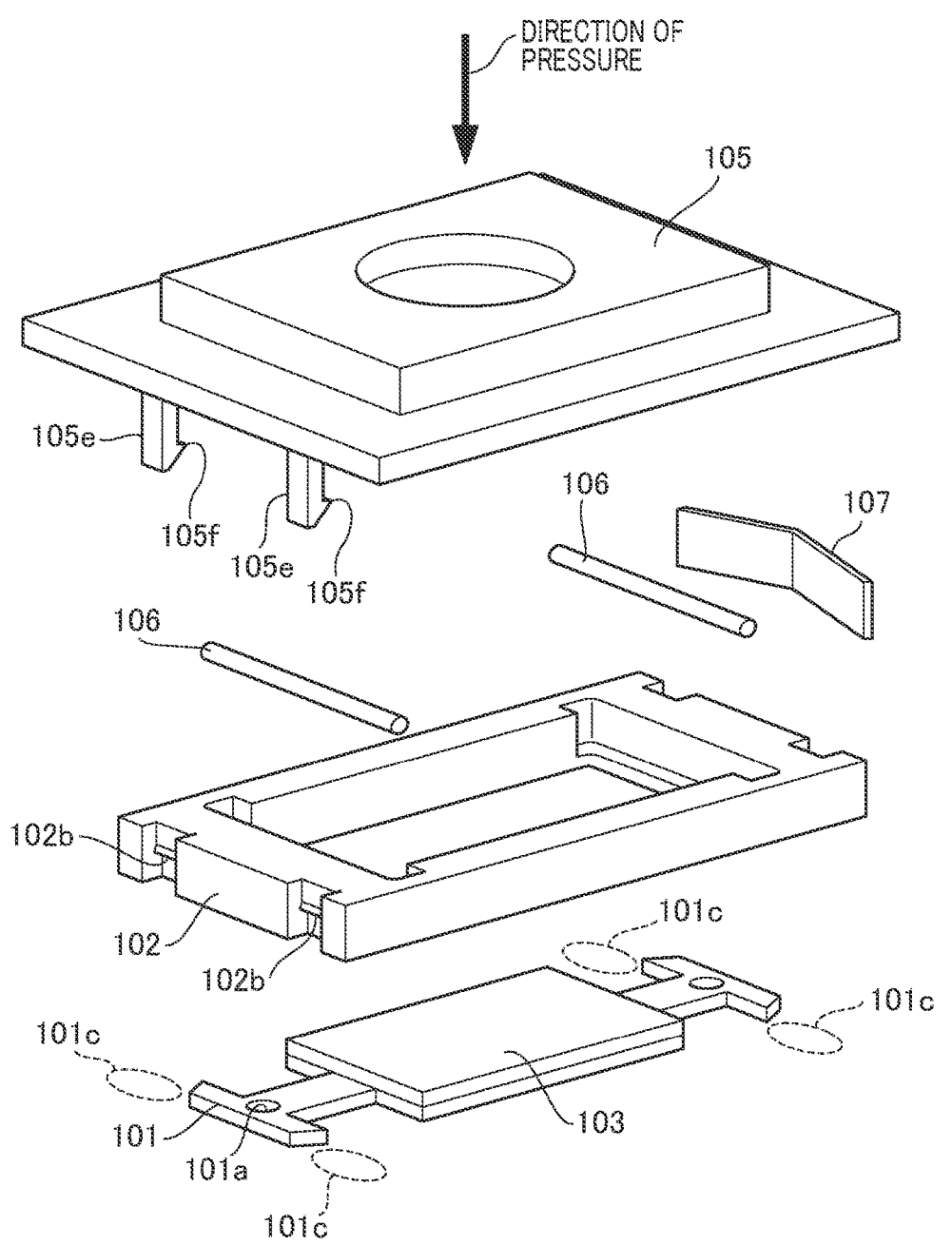
FIG. 3 is a perspective view of a major part of a temporary fixing part.

FIG. 3 is a perspective view of a major part of a temporary fixing part. The temporary fixing part configured to restrict a movement of the direction of pressure of the base 102 and the holding member 105 is formed at the base 102 and the holding member 105. A plurality of arms 105e extending in the direction of pressure and hooks 105f formed at tips thereof are formed at the holding member 105 as a single body. The arms 105e are formed opposite the coupling unit across the base 102. The temporary fixing part in which the plurality of engaging portions 102b are formed so that the holding member 105 and the base 102 are prevented from being separated from each other or the roller shaft 106 which is the rolling member incorporated therein are prevented from dropping out in the temporarily held state is realized at the base 102. As shown in FIG. 3, the temporary fixing part is set at both side portions 101c of the joined portion 101a formed at a tip of the vibrator so that miniaturization thereof in the direction perpendicular to the pressure (see FIG. 2) is realized.

Figure 4A:
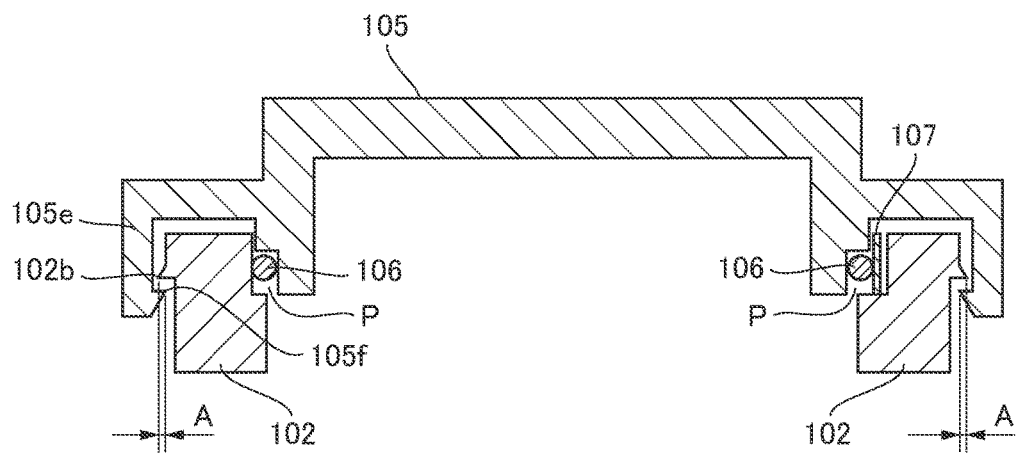
FIGS. 4A and 4B are cross-sectional views of the major part for describing a structure of the temporary fixing part.
Figure 4B:
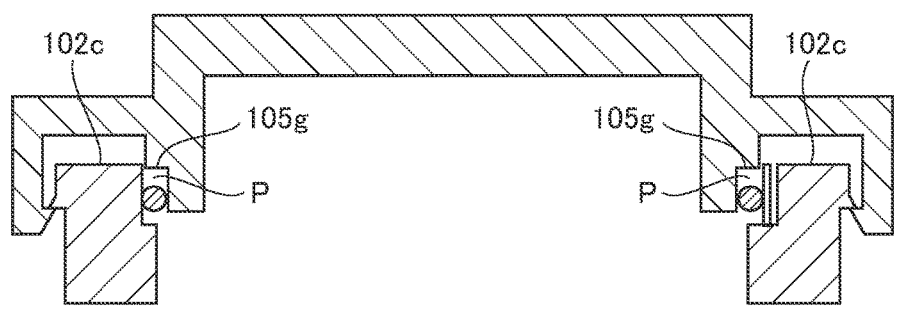

FIGS. 4A and 4B are cross-sectional views of the major part for describing a structure of the temporary fixing part. As shown in FIG. 4B, the hooks 105f formed at the holding member 105 interfere with the engaging portions 102b formed on the base 102 so that the hooks 105f and the engaging portions 102b cannot be separated from each other in the temporarily held state. This is because tips of the hooks 105f overlap tips of the engaging portions 102b by A in a horizontal direction in FIG. 4A in the incorporated state as shown in FIG. 4A. A so-called snap-fitting in which the arms 105e are elastically deformed using flexibility thereof and pass over and are incorporated into the engaging portions 102b formed at the base 102 is performed at the time of incorporating.

As shown in FIG. 4A, the hooks 105f and the engaging portions 102b are configured not to come into contact with each other in a usage state. Also, as shown in FIG. 4B, dropout preventing portions 105g are formed at the holding member 105 such that the roller shafts 106 do not drop out of an incorporated portion even in a state in which the hooks 105f formed at the holding member 105 are engaged with the engaging portions 102b formed at the base 102. At this time, as shown in FIG. 4B, the dropout preventing portions 105g are set to be level with or lower than an upper surface 102c of the base 102 (to be positioned at a lower side in FIG. 4B) to prevent the roller shafts 106 from dropping out.

Figure 5:
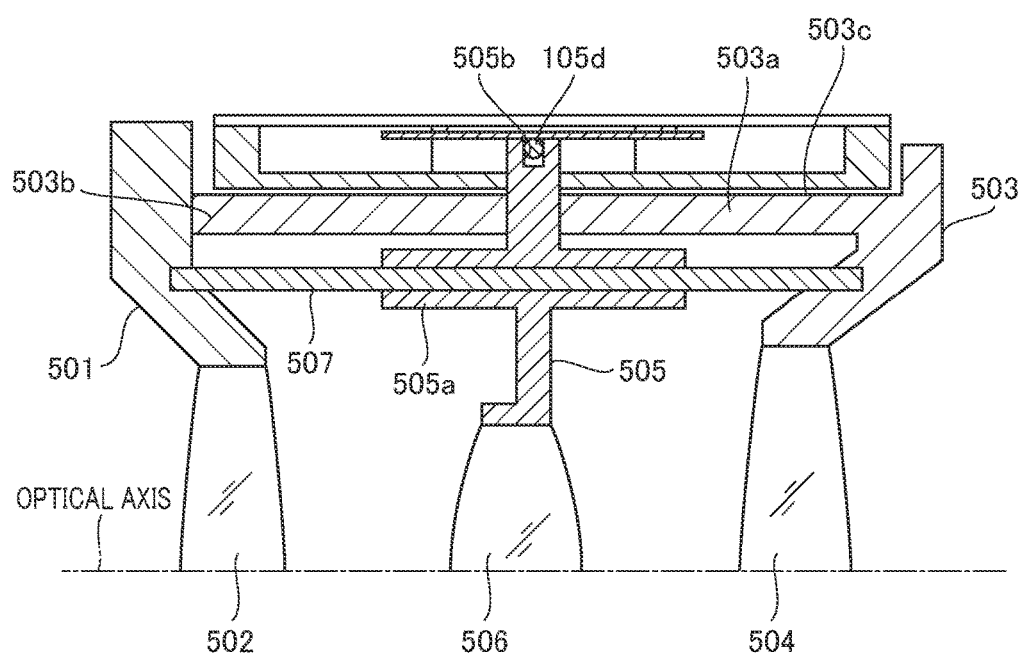
FIG. 5 is a view illustrating a lens barrel of an optical device into which an ultrasonic motor is incorporated.

FIG. 5 is a view illustrating a lens barrel of an optical device into which an ultrasonic motor is incorporated. A first lens holding member 501 holds a first lens 502. A third lens holding member 503 holds a third lens 504. An outer circumferential portion of the third lens holding member 503 has a cylindrical portion 503a and a distal portion 503b thereof is fastened to the first lens holding member 501 using screws. A unit receiving portion 503c to which the ultrasonic motor is fixed is provided at a part of an outer diameter portion of the cylindrical portion 503a to be detachably fixed using well-known screws. Also, the second lens holding member 505 configured to hold the second lens 506 is disposed at an inner diameter portion of the cylindrical portion 503a.

The second lens 506 moves along an optical axis due to the ultrasonic motor as a focusing lens. At this time, since a well-known guide bar 507 and a bearing portion 505a are fitted to each other to be capable of relative sliding in the second lens holding member 505, the second lens can be caused to move along the optical axis. The second lens holding member 505 and the holding member 105 may be coupled to each other, for example, through engagement of an engagement pin 105d provided at the holding member 105 and an engaged portion 505b provided at the second lens holding member 505 and using a rack and an engagement pin which are well known.

As described above, the vibration type actuator of the embodiment has the configuration in which the holding member 105 and the base 102 to which the vibrator 100 is fixed are coupled to each other by means of the roller shafts 106 and the leaf spring 107. Therefore, the vibrator 100 and the base 102 can stabilize the pressing force with respect to the holding member 105 in the direction of pressure by means of the pressing unit 120 through a rolling action. Also, the movement direction of the driven member is maintained without backlash due to an action of the leaf spring 107 so that, for example, a focusing lens 306 of the optical device can be accurately controlled to be driven in an optical axis direction. In addition, since a structure in which temporary assembly is possible such that damage of workability such as separation of the holding member 105 from the base 102, dropout of the roller shafts 106, and the like does not occur at the time of assembling is provided, an ultrasonic mode in which the pressing force is stabilized and having excellent assembling workability can be realized. Although a specific example of the vibration type actuator of the embodiment and the lens barrel of the optical device into which the vibration type actuator is incorporated has been described in detail above, the present invention is not limited to the above-described embodiment.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-096177, filed May 11, 2015 which is hereby incorporated by reference herein in its entirety.

What is claimed is:

1. A vibration type actuator comprising:
   a vibrator that includes a vibration plate and a piezoelectric element fixed to the vibration plate and vibrates due to a driving voltage;
   a sliding member that frictionally contacts with the vibrator;
   a pressing unit that presses the vibrator to the sliding member;
   a base to which the vibration plate is fixed;
   a holding member that holds the base;
   a coupling unit that couples the base with the holding member in a relative movement direction between the vibrator and the sliding member due to the vibration, and moves the base with respect to the holding member in a direction of pressure of the pressing unit; and
   a temporary fixing part that is formed at the base and the holding member and restricts a movement in the direction of pressure of the base and the holding member.

2. The vibration type actuator according to claim 1, wherein the coupling unit includes a rolling member and an elastic biasing member which are incorporated into an incorporation space between the base and the holding member,
   wherein the rolling member freely move the base with respect to the holding member in the direction of pressure of the pressing unit, and the elastic biasing member elastically biases the rolling member in the relative movement direction between the vibrator and the sliding member.

3. The vibration type actuator according to claim 2, wherein the incorporation space is formed between the base and an extending portion extending in the direction of pressure of the pressing unit included in the holding member.

4. The vibration type actuator according to claim 2, wherein the incorporation space is formed in two locations at a front, side and a rear side in the relative movement direction of the vibrator and the sliding member across a pressure contact portion pressed against the sliding member of the vibrator.

5. The vibration type actuator according to claim 2, wherein the elastic biasing member elastically biases the rolling members so that the holding member and the base are biased in directions opposite to each other.

6. The vibration e actuator according to claim 1, wherein the temporary fixing part comprises:
   arms provided at the holding member and extending in the direction of pressure;
   hooks formed at tips of the arms; and
   engaging portions provided at the base and configured to be engaged with the hooks.

7. The vibration type actuator according to 6, wherein the arms are formed opposite the coupling unit across the base.

8. The vibration type actuator according to claim 6, wherein the holding ember includes dropout preventing portions that pr the rolling members from dropping out a state in which the hooks and the engaging portions are engaged with each other.

9. The vibration t type actuator according to claim 6, wherein the hooks and the engaging portions do not contact with each other in a state in which the vibration type actuator is in use.

10. The vibration type actuator according to claim 1, wherein the vibrator generates ultrasonic vibrations due to an applied high frequency voltage.

* * * * *